United States Patent
Sakamoto (10) Patent No.: US 11,556,583 B2
(45) Date of Patent: Jan. 17, 2023

(54) INFORMATION PROCESSING SYSTEM, INFORMATION PROCESSING METHOD, AND STORAGE MEDIUM

(71) Applicant: NEC CORPORATION, Tokyo (JP)

(72) Inventor: Shizuo Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 16/637,856

(22) PCT Filed: Aug. 31, 2018

(86) PCT No.: PCT/JP2018/032300
§ 371 (c)(1),
(2) Date: Feb. 10, 2020

(87) PCT Pub. No.: WO2019/045033
PCT Pub. Date: Mar. 7, 2019

(65) Prior Publication Data
US 2020/0250225 A1    Aug. 6, 2020

(30) Foreign Application Priority Data

Sep. 4, 2017    (JP) .............................. JP2017-169298

(51) Int. Cl.
*G06F 16/583*    (2019.01)
*G06F 16/54*    (2019.01)
(Continued)

(52) U.S. Cl.
CPC .......... *G06F 16/5854* (2019.01); *G06F 16/54* (2019.01); *G06F 16/5838* (2019.01); *G06N 3/02* (2013.01); *G06T 3/4038* (2013.01)

(58) Field of Classification Search
CPC ... G06F 16/5854; G06F 16/5838; G06F 16/54
(Continued)

(56) References Cited

U.S. PATENT DOCUMENTS

2012/0215805 A1    8/2012    Homma et al.
2012/0254790 A1*   10/2012   Colombino ............. G06F 16/54
                                                               715/781
(Continued)

FOREIGN PATENT DOCUMENTS

JP    11-224262 A    8/1999
JP    2002-183472 A    6/2002
(Continued)

OTHER PUBLICATIONS

Hiroyuki Haga, et al., "Study on Effect of IP QoS Degradation on Web Usability with Severity Rating", IEICE Technical Report, Dec. 8, 2011, pp. 1-8, vol. 111, No. 347.
(Continued)

*Primary Examiner* — Kimberly L Wilson
(74) *Attorney, Agent, or Firm* — Sughrue Mion, PLLC (57) ABSTRACT

Provided is an information processing system including: a feature information accepting unit that, by causing a user to specify a position in a feature map in which a plurality of feature images indicating features to be displayed are arranged, accepts entry of feature information associated with the position in the feature map; an image acquisition unit that acquires an image used for display based on the feature information; and a display information generation unit that generates display information used for causing a display device to display the image used for display.

17 Claims, 8 Drawing Sheets

(51) Int. Cl.
*G06N 3/02* (2006.01)
*G06T 3/40* (2006.01)
(58) Field of Classification Search
USPC ............................................. 707/736
See application file for complete search history.

(56) References Cited

U.S. PATENT DOCUMENTS

| 2015/0220244 | A1* | 8/2015 | Vats | G06F 3/04845 |
| | | | | 715/850 |
| 2015/0302027 | A1* | 10/2015 | Wnuk | G06V 20/64 |
| | | | | 382/305 |
| 2018/0181802 | A1* | 6/2018 | Chen | G06V 10/454 |
| 2020/0074205 | A1* | 3/2020 | Yi | G06V 20/54 |

FOREIGN PATENT DOCUMENTS

| JP | 2002279251 A | 9/2002 |
| JP | 2004-029957 A | 1/2004 |
| JP | 2004-102503 A | 4/2004 |
| JP | 2006-031200 A | 2/2006 |
| JP | 2008-217220 A | 9/2008 |
| JP | 2012-174029 A | 9/2012 |
| JP | 2013-246659 A | 12/2013 |
| JP | 2016-004549 A | 1/2016 |

OTHER PUBLICATIONS

International Search Report for PCT/JP2018/032300 dated Oct. 16, 2018, [PCT/ISA/210].
Written Opinion for PCT/JP2018/032300 dated Oct. 16, 2018, [PCT/ISA/210].
Japanese Office Action for JP Application No. 2019-539653 dated Feb. 4, 2021 with English Translation.
Japanese Office Action for JP Application No. 2019-539653 dated May 20, 2021 with English Translation.

* cited by examiner

FIG. 9

INFORMATION PROCESSING SYSTEM, INFORMATION PROCESSING METHOD, AND STORAGE MEDIUM

CROSS REFERENCE TO RELATED APPLICATIONS

This application is a National Stage of International Application No. PCT/JP2018/032300 filed Aug. 31, 2018, claiming priority based on Japanese Patent Application No. 2017-169298 filed Sep. 4, 2017.

TECHNICAL FIELD

The present invention relates to an information processing system, an information processing method, and a storage medium.

BACKGROUND ART

Various image searching schemes for obtaining a desired image from a large amount of image data stored in a database have been studied.

Patent Literature 1 discloses an image processing device that searches a database for an image. Patent literature 1 discloses that the image processing device has a function of searching for image data corresponding to a word when a user inputs the word and displaying the searched image on a display unit.

CITATION LIST

Patent Literature

PTL 1: Japanese Patent Application Laid-Open No. 2004-102503

SUMMARY OF INVENTION

Technical Problem

In a searching scheme as disclosed in Patent literature 1, for some object of an image intended to display, it may be difficult for a user to appropriately recognize a feature of an image and select a word used for searching. Accordingly, there is a demand for a scheme that enables easier display of a desired image.

The present invention has been made in view of the above problem and intends to provide an information processing system, an information processing method and a storage medium that enables easier display of a desired image.

Solution to Problem

According to one example aspect of the present invention, provided is an information processing system including: a feature information accepting unit that, by causing a user to specify a position in a feature map in which a plurality of feature images indicating features of bicycles to be displayed are arranged, accepts entry of feature information associated with the position in the feature map; an image acquisition unit that acquires an image used for display of a bicycle based on the feature information; and a display information generation unit that generates display information used for causing a display device to display the image used for display.

According to another example aspect of the present invention, provided is an information processing method including: by causing a user to specify a position in a feature map in which a plurality of feature images indicating features of bicycles to be displayed are arranged, accepting entry of feature information associated with the position in the feature map; acquiring an image used for display of a bicycle based on the feature information; and generating display information used for causing a display device to display the image used for display.

According to yet another example aspect of the present invention, provided is a storage medium storing a program that causes a computer to perform: by causing a user to specify a position in a feature map in which a plurality of feature images indicating features of bicycles to be displayed are arranged, accepting entry of feature information associated with the position in the feature map; acquiring an image used for display of a bicycle based on the feature information; and generating display information used for causing a display device to display the image used for display.

According to yet another example aspect of the present invention, provided is an information processing system including: a feature information accepting unit that, by causing a user to specify a position in a feature map in which a plurality of feature images indicating features of objects to be displayed are arranged, accepts entry of feature information associated with the position in the feature map; an image acquisition unit that acquires an image used for display based on the feature information; and a display information generation unit that generates display information used for causing a display device to display the image used for display.

Advantageous Effects of Invention

According to the present invention, an information processing system, an information processing method and a storage medium that enables easier display of a desired image can be provided.

DESCRIPTION OF EMBODIMENTS

The example embodiments of the present invention will be described below with reference to the drawings. In the drawings, the same components or corresponding components are labeled with the same reference symbols, and the description thereof may be omitted or simplified.

[First Example Embodiment]

The present example embodiment relates to an information processing system for acquiring an image of a bicycle desired by a user and displaying the bicycle on a display device. When a bicycle is included in an image captured by a surveillance camera or the like, the bicycle may be an important information source. However, the image quality of an image of a bicycle captured by a surveillance camera or the like may be insufficient. Thus, a model of a bicycle is visually identified from a captured image of a bicycle, and a high-resolution image of a bicycle may be then acquired from a catalog or the like. Accordingly, since an image of a bicycle is replaced with a high-resolution image, the image of a bicycle may be effectively used.

However, there are various models of bicycles, and it is difficult to recognize a model name by appearance as with an automobile. Further, unlike automobiles, display of information on a model name, a manufacturer name, or the like may be small and may not be viewed from a photograph in many cases. Alternatively, information on a model name, a manufacturer name, or the like may not be displayed on a bicycle body in many cases. Accordingly, it may be difficult to visually identify a model from an image captured by a surveillance camera or the like and search for the image thereof. In particular, it is difficult to identify a model for models of a small-lot production, a model manufactured by collecting a plurality of components, a model for which a minor change is made on a lot basis, a model not listed on a catalog, a model manufactured in a short production period, or the like. Even when a model can be identified, it may be difficult to acquire a corresponding image, or a corresponding image may not exist. Thus, it may not be easy to search for an image of the same model from images of bicycles captured by a surveillance camera or the like and replace the searched image with a high-resolution image. Accordingly, there is a demand for an information processing system that enables easier display of a desired image of a bicycle. The information processing system of the present example embodiment realizes a function of enabling easier display of a desired image of a bicycle.

Note that "bicycle" in this specification is a generic term for vehicles that are driven and steered mainly by manpower of a person who rides on the vehicle by using a pedal or a hand crank, have one or more driving wheels, and run on the ground. Accordingly, while the number of wheels included in a bicycle is not particularly limited, "bicycle" may include not only a two-wheeled bicycle but also a tricycle, a bicycle with training wheels, or the like. Further, a motor assist bicycle having auxiliary power is included in "bicycle".

Figure 1:
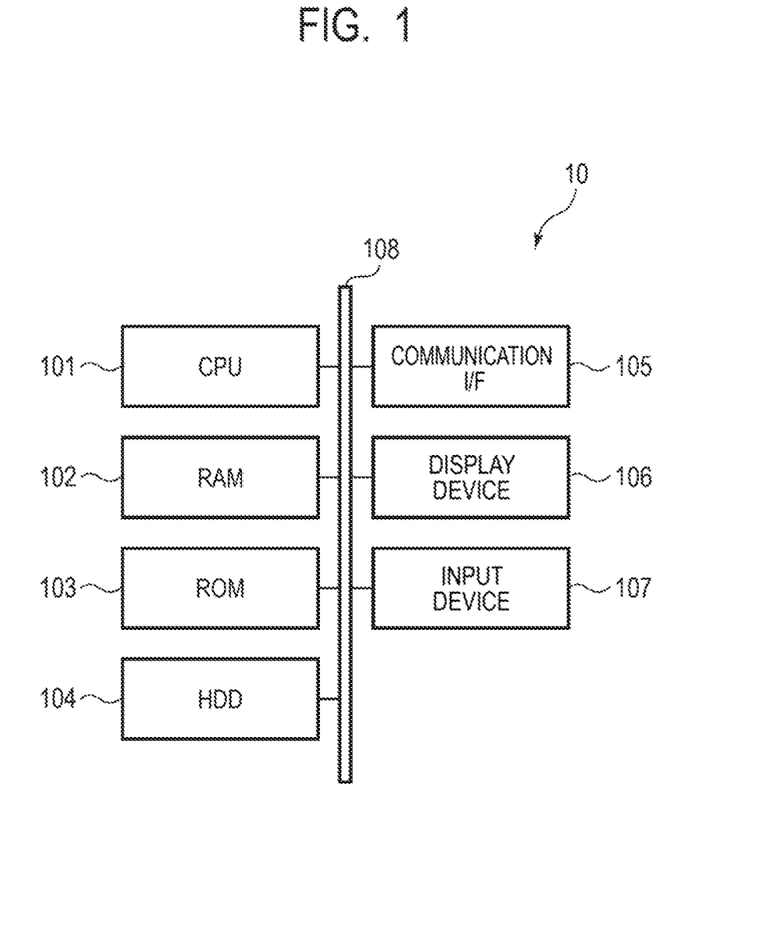
FIG. 1 is a block diagram illustrating a hardware configuration example of an information processing system according to a first example embodiment.

FIG. 1 is a block diagram illustrating a hardware configuration example of an information processing system 10 according to a first example embodiment of the present invention. The information processing system 10 may be a computer such as a desktop personal computer (PC), a laptop PC, a tablet PC, or the like, for example. Further, the information processing system 10 may be an information communication terminal such as a smartphone, a cellular phone, or the like.

The information processing system 10 has a central processing unit (CPU) 101, a random access memory (RAM) 102, a read only memory (ROM) 103, and a hard disk drive (HDD) 104 for realizing a function as a computer that performs calculation, control, and storage. Further, the information processing system 10 has a communication interface (I/F) 105, a display device 106, and an input device 107. The CPU 101, the RAM 102, the ROM 103, the HDD 104, the communication I/F 105, the display device 106, and the input device 107 are connected to each other via a bus 108. Note that the display device 106 and the input device 107 may be connected to the bus 108 via a drive device (not illustrated) used for driving these devices.

While components forming the information processing system 10 are illustrated as an integrated device in FIG. 1, some of these functions may be provided as an external device. For example, the display device 106 and the input device 107 may be an external device independent of a part forming the function of a computer including the CPU 101 or the like.

The CPU 101 has a function of performing a predetermined operation in accordance with a program stored in the ROM 103, the HDD 104, or the like and also controlling each component of the information processing system 10. The RAM 102 is formed of a volatile storage medium and provides a temporary memory area necessary for the operation of the CPU 101. The ROM 103 is formed of nonvolatile storage medium and stores necessary information such as a program used for the operation of the information processing system 10. The HDD 104 is a storage device that is formed of a nonvolatile storage medium and stores image data, program, or the like.

The communication I/F 105 is a communication interface based on the standard such as Wi-Fi (registered trademark), 4G, or the like, which is a module used for communicating with other devices. The display device 106 is a liquid crystal display, an organic light emitting diode (OLED) display, or the like and is used for displaying an image, a text, an interface, or the like. The input device 107 is a keyboard, a pointing device, or the like and is used by the user for operating the information processing system 10. An example of the pointing device may be a mouse, a trackball, a touchscreen, or the like. The display device 106 and the input device 107 may be integrally formed as a touchscreen.

Note that the hardware configuration illustrated in FIG. 1 is an example, and a device other than the above may be added, or some of the devices may not be provided. Further, some of the devices may be replaced with another device having the same function. Furthermore, a part of the function of the present example embodiment may be provided by another device via a network, the function of the present example embodiment may be implemented by being distributed in a plurality of devices. For example, the HDD 104 may be replaced with a solid state drive (SSD) using a semiconductor memory or may be replaced with cloud storage.

Figure 2:
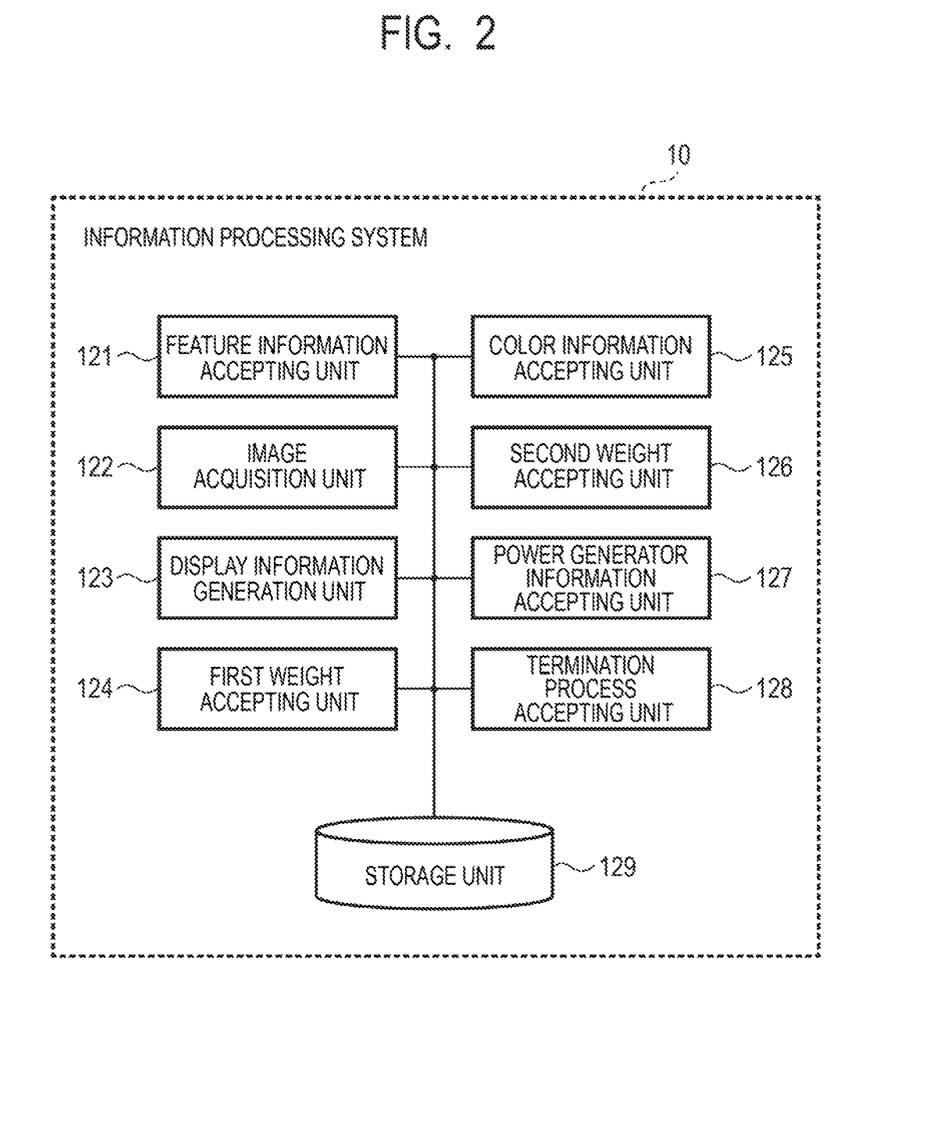
FIG. 2 is a function block diagram of the information processing system according to the first example embodiment.

FIG. 2 is a function block diagram of the information processing system 10 according to the present example embodiment. The information processing system 10 has a feature information accepting unit 121, an image acquisition unit 122, a display information generation unit 123, a first weight accepting unit 124, a color information accepting unit 125, a second weight accepting unit 126, a power generator information accepting unit 127, a termination process accepting unit 128, and a storage unit 129.

The CPU 101 implements functions of the feature information accepting unit 121, the image acquisition unit 122, the display information generation unit 123, the first weight accepting unit 124, the color information accepting unit 125, the second weight accepting unit 126, the power generator information accepting unit 127, and the termination process accepting unit 128 by loading a program stored in the ROM 103 or the like to the RAM 102 and executing the program. The processes performed on these units will be described later. The CPU 101 causes the display device 106 to display an image based on the display information generated by the display information generation unit 123. The CPU 101 implements a function of the storage unit 129 by controlling the HDD 104. The storage unit 129 functions as a database storing data of a feature map, an image of a bicycle, feature information associated with an image of a bicycle, or the like.

Figure 3:
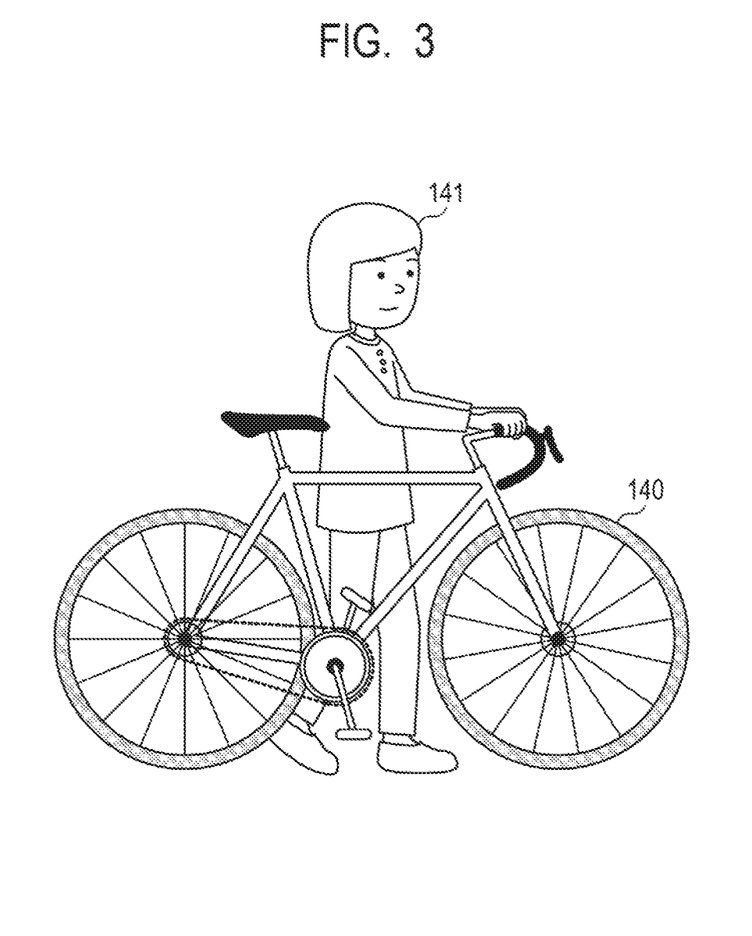
FIG. 3 is an example of an image including a bicycle captured by a surveillance camera.

The outline of a process in the present example embodiment, a configuration of a graphical user interface (GUI), a display window of an image of a bicycle, or the like will be described with reference to FIG. 3 to FIG. 7. FIG. 3 is an example of an image (hereinafter referred to as an original image) that is a source for identifying a bicycle that the user intends to display by using the information processing system 10. The original image may be an image captured by a surveillance camera, for example. The original image includes a bicycle 140 and a person 141 walking the bicycle 140. The information processing system 10 of the present example embodiment has a function of supporting acquisition of an image of the same bicycle as the bicycle 140 included in the image as illustrated in FIG. 3 and display of the acquired image on the display device 106.

Figure 4:
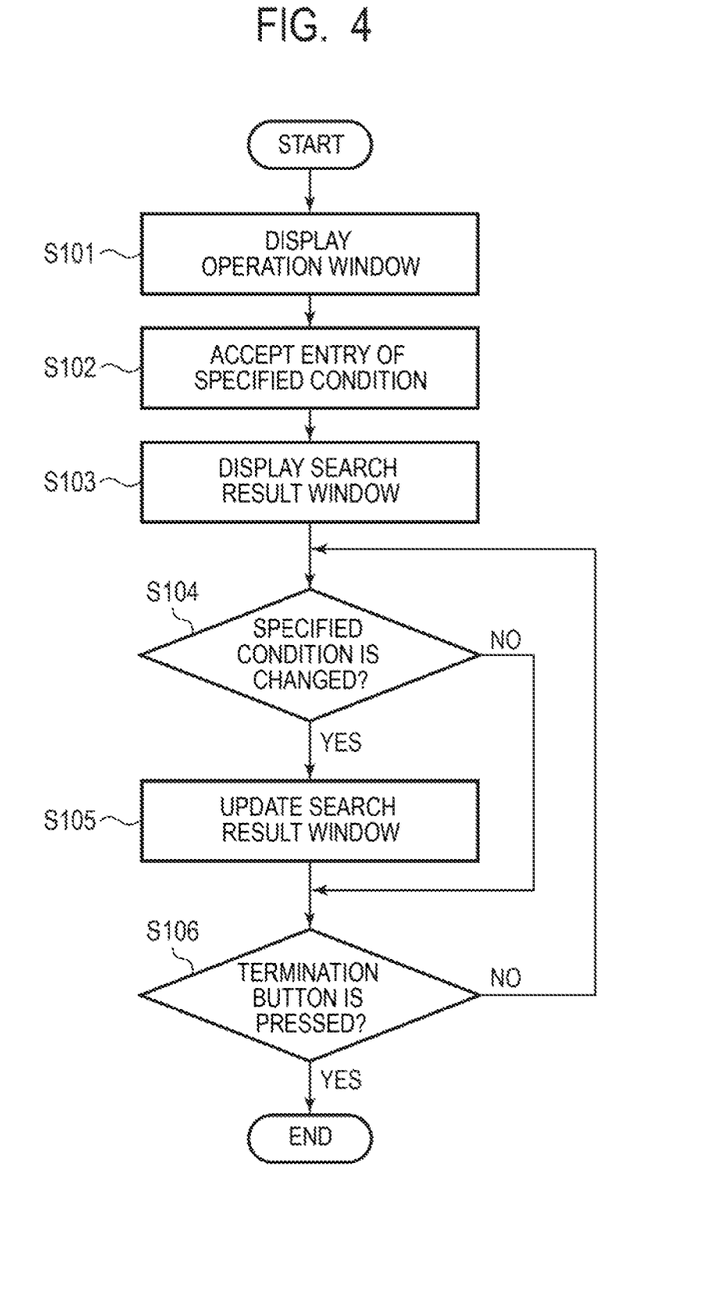
FIG. 4 is a flowchart illustrating an outline of a process performed by the information processing system according to the first example embodiment.

FIG. 4 is a flowchart illustrating the outline of a process performed by the information processing system 10 according to the present example embodiment. The process in the present example embodiment will be described along process order in this flowchart with reference to FIG. 5 to FIG. 7 if necessary. When a process performed by the information processing system 10 is started based on a user operation, in step S101, the CPU 101 causes the display information generation unit 123 to generate display information on an operation window and the display device 106 to display the operation window. In step S102, the feature information accepting unit 121, the first weight accepting unit 124, the color information accepting unit 125, the second weight accepting unit 126, and the power generator information accepting unit 127 accept entry of specified conditions based on a user operation in the operation window.

Figure 5:
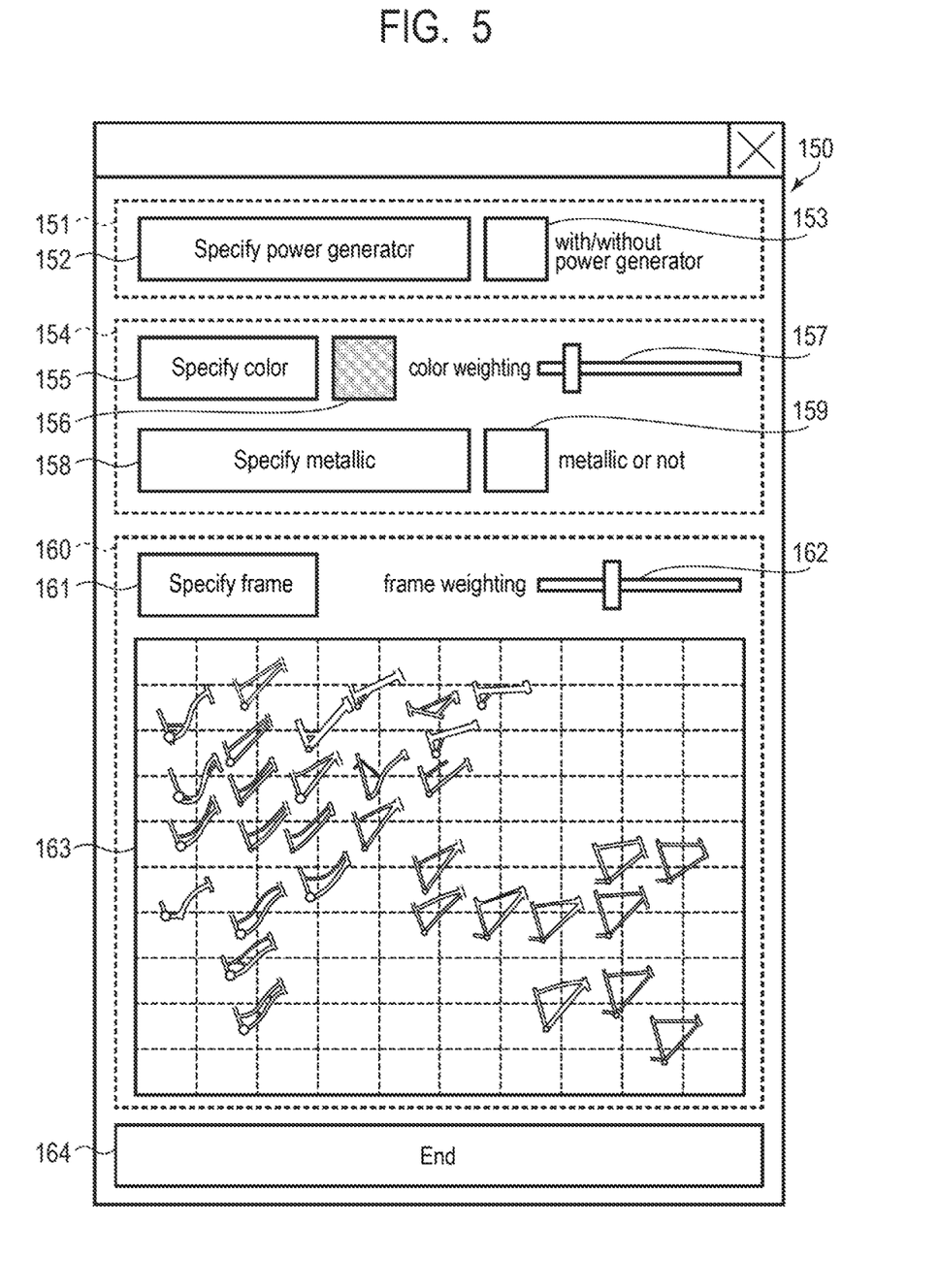
FIG. 5 is a diagram illustrating an operation window according to the first example embodiment.

The configuration of an operation window will now be described with reference to FIG. 5 and FIG. 6. FIG. 5 is a diagram illustrating an operation window 150 according to the present example embodiment. The operation window 150 illustrated in FIG. 5 is a GUI displayed on a screen of the display device 106, and a user can intuitively operate it by using a pointing device or the like that is one of the input devices 107. By operating the operation window 150, the user can input a specified condition indicating a feature of an image of a bicycle to be displayed. In the operation window 150, a power generator information specification region 151, a color information specification region 154, and a frame information specification region 160 are arranged in this order from the upper part. Further, a button 164 indicating "end" is provided below the frame information specification region 160.

In the power generator information specification region 151, a button 152 indicating "specify power generator", and a check box 153 indicating "with/without power generator" are provided. Every time the user presses the button 152, the check box 153 is switched between an operable state and an inoperable state. When the check box 153 is in the operable state, the user can operate the check box 153 to switch whether or not the check box 153 is checked. When the user believes that the power generator for supplying power to a light of a bicycle in the original image is provided, the user can check the check box 153 to specify a condition that the bicycle intended to display has a power generator. In such a way, the power generator information specification region 151 functions as the power generator information accepting unit 127 that accepts entry of power generator information indicating whether or not the bicycle intended to display has a power generator. Accordingly, by inputting the presence/absence of the power generator that is a characteristic component of the bicycle as the specified condition, it is possible to efficiently refine images of bicycles to be displayed.

In the color information specification region 154, a button 155 indicating "specify color", a color display part 156, a slider 157 indicating "color weighting", a button 158 indicating "specify metallic", and a check box 159 indicating "metallic or not" are provided. When the user presses the button 155, this enables the user to set a color condition of the bicycle intended to display. This setting may display a dialog for setting a color and allow the user to select a color from samples. Alternatively, the setting may allow the user to input RGB values and select a color name such as "yellow" by displaying a dropdown list, a radio button, or the like. The dialog described above may be a common dialog typically provided in operating system (OS), for example. When a color is set, the color is displayed in the color display part 156. In such a way, the color information specification region 154 functions as the color information accepting unit 125 that accepts entry of color information related to a color of a bicycle intended to display. Accordingly, it is possible to efficiently refine images of bicycles to be displayed.

Note that, in this specification, "color" may include not only chromatic colors but also achromatic colors (white, gray, black). Further, with respect to "color of bicycle", while a position colored in the color or interest is not particularly limited, the color of a position that may characterize a bicycle (for example, a frame) is mainly referred. For example, when the frame color of a bicycle is yellow, since the tire color of the bicycle is black, the frame color is more characteristic than the tire color, the color of the bicycle is specified to be yellow.

The slider 157 is a widget for setting weighting provided to color information in searching for a bicycle described later. The value in accordance with the position of the nob of the slider 157 is set as a weighting value. In such a way, the slider 157 functions as the second weight accepting unit 126 that accepts entry of weighting provided to color information.

Furthermore, as one type of methods for specifying color information, a metallic color that is a color having metallic luster can be set. Every time the user presses the button 158, the check box 159 is switched between an operable state and an inoperable state. When the check box 159 is in the operable state, the user can operate the check box 159 to switch whether or not the check box 159 is checked. When the user believes that the color of the bicycle is not a color expressed by combination of typical RGB colors and is a metallic color, by checking the check box 159, the user can specify a condition in which the color of the bicycle is a metallic color. The metallic color may be, for example, gold or silver. Accordingly, it is possible to efficiently refine images of bicycles to be displayed.

Note that, as one type of methods for specifying color information, a fluorescent color using fluorescent coating or a luminous color using luminous coating can be further set.

In the frame information specification region 160, a button 161 indicating "specify frame", a slider 162 indicating "frame weighting", and a feature map display part 163 are provided. When the user presses the button 161, the user can select a position in a feature map displayed in the feature map display part 163 by using a pointing device. When the user selects a position in the feature map, the feature information on a frame of a bicycle associated with the position is set. In such a way, the frame information specification region 160 functions as the feature information accepting unit 121 that accepts entry of feature information associated with the position on the feature map. Details of the configuration and a method of the operation of the feature map will be described later.

The slider 162 is a widget for setting weighting provided to feature information in searching for a bicycle described later. The value in accordance with the position of the nob of the slider 162 is set as a weighting value. In such a way, the slider 162 functions as the first weight accepting unit 124 that accepts entry of weighting provided to feature information.

When a user presses the button 164, a process ends, and the operation window 150 is closed. In such a way, the button 164 functions as the termination process accepting unit 128 that accepts termination of a process.

Note that, also when a user presses a close button (button marked with X) in a window arranged in the upper right of the operation window 150, a process may end in the same manner. That is, the close button may also function as the termination process accepting unit 128 that accepts termination of a process. In such a case, the button 164 may be omitted.

Figure 6:
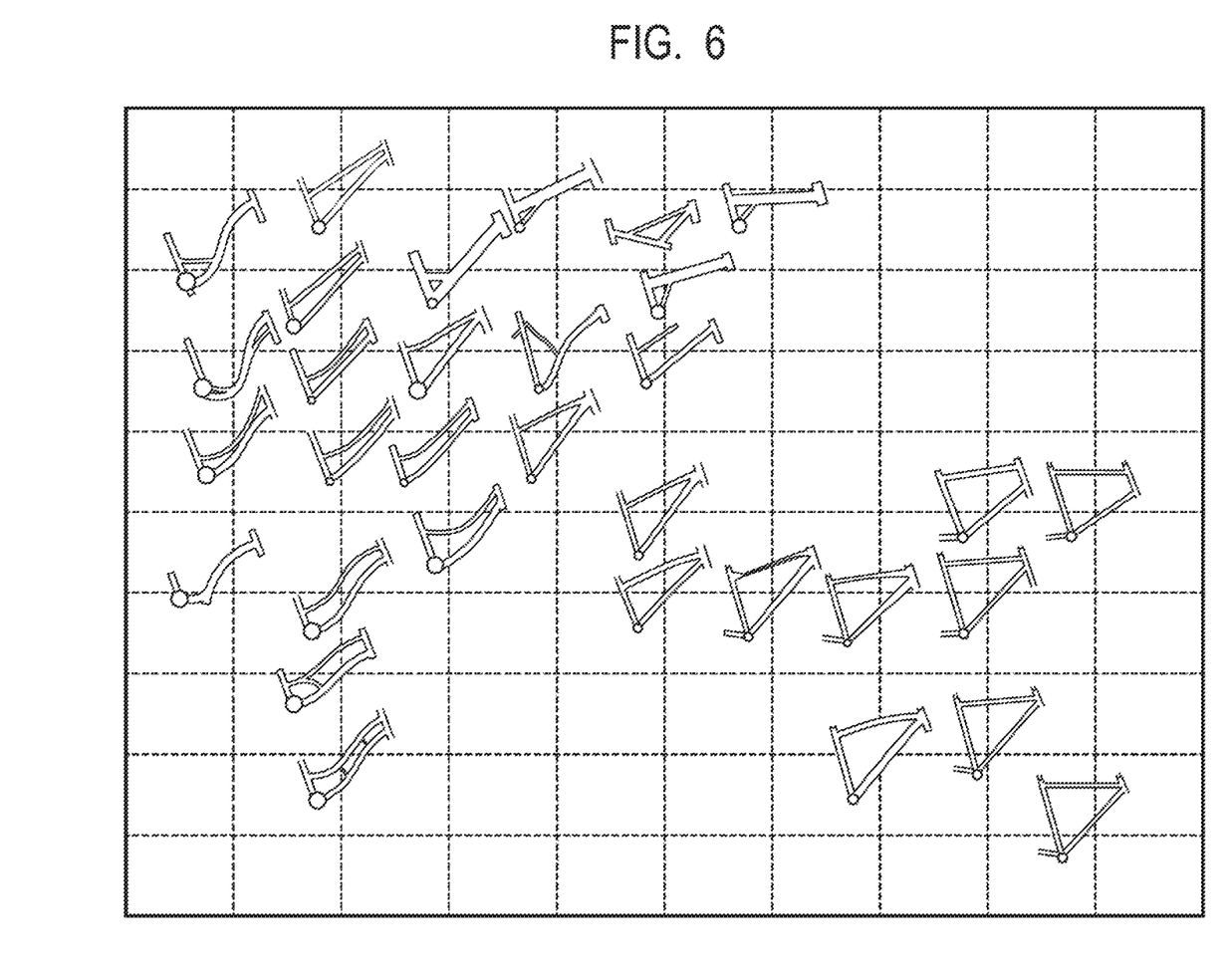
FIG. 6 is a diagram illustrating a feature map for specifying a frame according to the first example embodiment.

FIG. 6 is a diagram illustrating the feature map used for specifying a frame of a bicycle according to the present example embodiment. In other words, FIG. 6 is an enlarged view of the feature map of frames of bicycles displayed in the feature map display part 163 of FIG. 5. In the feature map, a number of images each indicating a shape of a frame that is a part of a bicycle are arranged on a two-dimensional plane.

In FIG. 6, the plurality of images are arranged at positions in accordance with the feature of frames, respectively. On the left side in FIG. 6, frames known as the step-through type, each of which is slanted and enables the user to easily get on and off the bicycle, are arranged. A frame closer to the upper left part has a linear frame shape, and a frame closer to the lower left part has a curved frame shape. On the right side, the frames known as diamond type each having a triangle shape are arranged, and the shape of the top tube changes from an oblique shape to a horizontal shape as arranged from the upper left part to the lower right part. In such a way, similar frames are arranged at positions close to each other, and frames that are significantly different in shape are arranged at positions distant from each other.

By searching the feature map for a bicycle whose frame is similar to the bicycle included in the original image and selecting a position close to the similar frame by using a pointing device, the user can input the feature of a frame.

As an example, it is assumed that the user intends to display a bicycle whose frame is similar to the frame of the bicycle 140 of FIG. 3. The frame of the bicycle 140 of FIG. 3 has a feature in which the top tube, the down tube, and the sheet tube form a large triangle and the upper side of the frame is substantially horizontal. By referencing the feature map of FIG. 6, the user searches the feature map for a frame that is similar to the frame of the bicycle 140. Since a frame near the lower right has a similar feature described above, the user clicks the position near the lower right of the feature map display part 163 of FIG. 5. The feature information indicating a frame shape of a bicycle is associated with each point in a two-dimensional map. Thus, the user has only to select a position in the feature map and does not need to directly input the feature information used for the internal process in the information processing system 10. Note that, when there is no similar frame in the feature map, the user may select a place where there is no frame. For example, when the user selects near the center in the lower part of FIG. 6, the intermediate shape between the frame in the lower left and the frame in the lower right is selected.

In techniques of image searching, a scheme in which a user inputs a feature of an image by a text, a sentence, a number, or the like is generally used. In such a technique, a user needs to express a feature of a bicycle by a text, a sentence, a number, or the like prior to searching, and it is not easy to express a shape of a feature component such as a frame of a bicycle in characters or a text. While a shape of a frame has a name such as diamond type, step-through type, mixte type, or the like, these names are not so common, and a user may not always be familiar with these names. On the other hand, with the GUI using the feature map of the present example embodiment, since the user has only to select a position of a frame having a similar shape and this enables intuitive entry, the user can easily input a feature of a bicycle.

While it is desirable that the feature information on a bicycle specified in the feature map be a shape of a frame that is a notable feature of a bicycle, a feature other than the above may be used. For example, the feature map may arrange images indicating shapes of a pedal, a tire, a saddle, a handle, a basket, a power generator, a light, a chain cover, or the like that, each of which is a part of a bicycle. A plurality of feature map display parts 163 may be provided so that two or more features can be specified out of various features described above.

A database stored in the storage unit 129 includes a number of images of bicycles, information such as feature information, color information, or power generator information, and bicycle information such as a model name of each bicycle. These pieces of information are associated with images of respective bicycles. The image acquisition unit 122 compares specified conditions of feature information, color information, power generator information, or the like, which is input by the user, with the information in the database and extracts and acquires, from a database, an image of a bicycle that is similar to these specified conditions as an image used for display. When both feature information and color information are specified, an image used for display is extracted considering weighting acquired in the first weight accepting unit 124 and the second weight accepting unit 126.

The reason why it is effective to provide weighting to feature information or color information will be described. The original image illustrated in FIG. 3 may be an unclear image for some capturing environment. For example, the color of an image may be unclear for a particular specification of a camera or a particular color of a light source. For example, in an image captured in the evening, since a ratio of red light in the sun light that is a light source is larger, this makes it difficult to recognize the original color. Further, when a camera is an infrared camera, the obtained image is typically monochrome. In these cases, the user may be unable to believe what color the bicycle 140 included in the original image has. Further, when a camera has low-resolution, when a subject is distant from a camera, when the image is captured in a dark place, when a blurring is caused due to motion of a subject, or the like, the shape of the bicycle 140 may not be accurately recognized. As discussed above, there is a case where the user is unable to believe that he/she recognizes the shape and the color of the bicycle 140 even when referencing the original image. In taking such a case into consideration, in the present example embodiment, by providing weighting in accordance with a certainty degree, it is possible to increase the possibility that a correct image used for display can be extracted even when the input feature information or color information is inaccurate.

Note that an image of a bicycle and bicycle information intended to be stored in the database are collected in advance from information sources that show a high-resolution image, such as a website of a bicycle manufacturer, a catalog of bicycles, an online store on the Internet, or the like.

In step S103 of FIG. 4, the CPU 101 causes the display information generation unit 123 to generate display information on a search result window including an image used for display acquired by the image acquisition unit 122 and causes the display device 106 to display the search result window. Note that, since OS that can display a plurality of windows at the same time may be used as the OS of a computer to which the present example embodiment may be applied, the operation window 150 can be caused to remain displayed also after the search result window is displayed.

Figure 7:
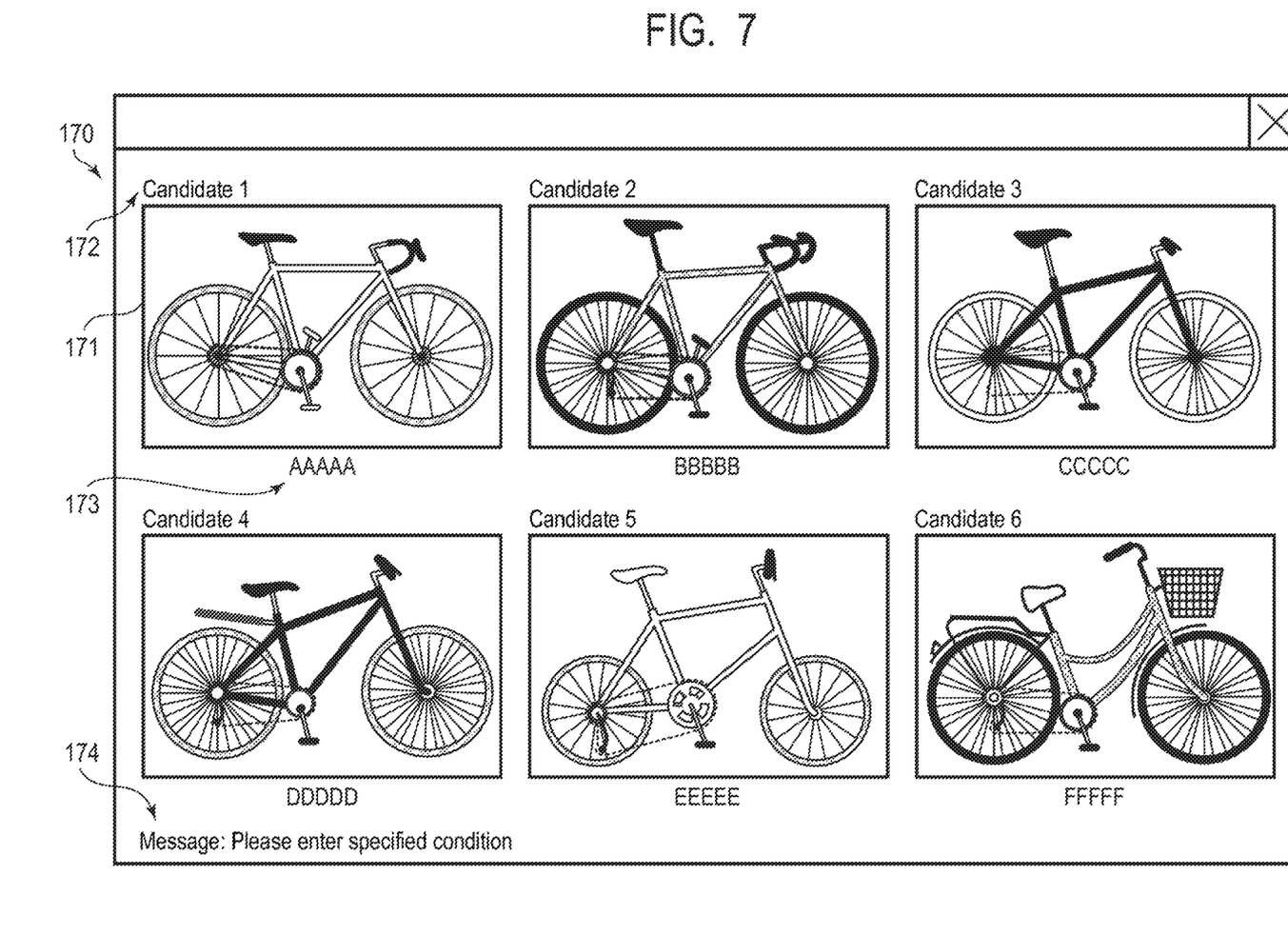
FIG. 7 is a diagram illustrating a search result window according to the first example embodiment.

Here, the configuration of the search result window will be described with reference to FIG. 7. FIG. 7 is a diagram illustrating a search result window 170 according to the present example embodiment. In the search result window 170, a plurality of bicycle image display parts 171, candidate number display parts 172 and bicycle information display parts 173 provided to respective bicycle image display parts 171, and a message display part 174 are provided. In the plurality of bicycle image display parts 171, images of bicycles used for display acquired by the image acquisition unit 122 are displayed. In this example, six images used for display are displayed in descending order from the image that is the closest to the specified conditions. The number of the displayed bicycle image display parts 171 is not particularly limited. Further, the number of the displayed bicycle image display parts 171 may be set in advance or may be variable. For example, the number of the displayed bicycle image display parts 171 may be automatically set in accordance with the window size of the search result window 170 or may be variable by being set by the user.

In the candidate number display part 172 arranged above the bicycle image display part 171, a candidate number of the image used for display is indicated. The candidate number indicates that the smaller number is closer to specified conditions. That is, a plurality of images used for display are displayed in the order based on specified conditions including feature information on a bicycle.

In the bicycle information display part 173 arranged below the bicycle image display part 171, the bicycle information related to the bicycle of an image used for display is indicated. In the field of the bicycle information, while "AAAAA", "BBBBB", and the like are temporarily displayed in FIG. 7, information added to a bicycle is displayed in the actual implementation. The bicycle information may be, for example, a model name, a model number, a manufacturer, a seller, a production period, a sales period, a sales area, a size, a weight, or the like of a displayed bicycle. Any one of the pieces of the bicycle information may be displayed, or multiple pieces of the bicycle information may be displayed. Further, the user may be able to select which bicycle information is displayed.

In the message display part 174, a message "please enter specified condition" that urges the user to input to the operation window 150 is displayed. The content of the message is not limited thereto as long as it is a message to be transferred to the user and may be "please check candidate images" or the like, for example.

With reference to FIG. 7, it can be seen that a bicycle of "candidate 1" is the same as the bicycle 140 of FIG. 3. Accordingly, the user can obtain a high-resolution image of the same bicycle as the bicycle 140 of FIG. 3. Further, the user can obtain the bicycle information added to the bicycle 140 such as a model name of the bicycle 140 by referencing the bicycle information display part 173.

In step S104 of FIG. 4, the CPU 101 determines whether or not the user has operated the operation window 150 to change the specified condition after displaying the search result window 170. If the specified condition is changed (step S104, YES), the process proceeds to step S105. If the specified condition is not changed (step S104, NO), the process proceeds to step S106.

In step S105, the information processing system 10 re-displays the search result window 170 based on the changed specified condition by the same process as step S102 and step S103 and thereby updates the search result window 170. The update of the search result window 170 is performed every time the user changes any of the specified conditions. Note that an update button may be arranged in the operation window 150 or the search result window 170, and the update of the search result window 170 may be performed every time the user presses the update button.

In step S106, the CPU 101 determines whether or not the button 164 (termination button) used for accepting a termination process in the termination process accepting unit 128 is pressed. If the button 164 is pressed (step S106, YES), the process ends. If the button 164 is not pressed (step S106, NO), the process proceeds to step S104.

As described above, according to the present example embodiment, by allowing the user to specify a position in the feature map in which the plurality of feature images indicating features of bicycles to be displayed are arranged, the user can input a feature by an intuitive operation. Thus, even when the object to be displayed is a bicycle whose model name is not easily recognized by appearance, entry of the bicycle feature can be facilitated. Accordingly, the information processing system 10, the information processing method, and the storage medium that enables easier display of a desired image of a bicycle can be provided.

The system described in the above example embodiment can be configured as with a second example embodiment described below.

[Second Example Embodiment]

Figure 8:
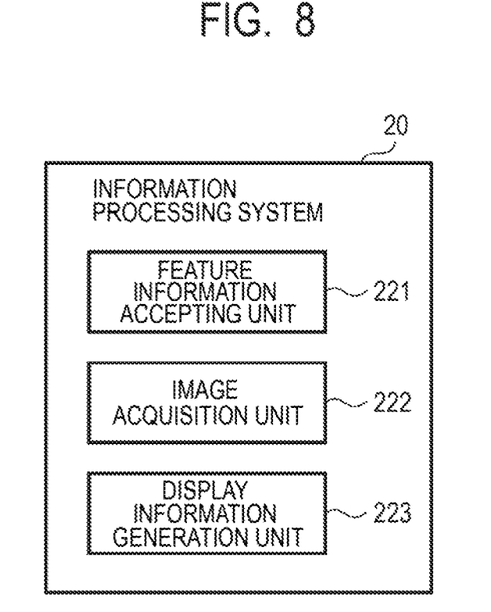
FIG. 8 is a function block diagram of an information processing system according to a second example embodiment.

FIG. 8 is a function block diagram of an information processing system 20 according to the second example embodiment. The information processing system 20 has a feature information accepting unit 221, an image acquisition unit 222, and a display information generation unit 223. The feature information accepting unit 221 accepts entry of feature information associated with a position of a feature map by causing the user to specify the position in the feature map in which a plurality of feature images indicating features of bicycles to be displayed are arranged. The image acquisition unit 222 acquires an image used for display of a bicycle based on the feature information. The display information generation unit 223 generates display information used for causing a display device to display the image used for display.

According to the present example embodiment, the information processing system 20 that enables easier display of a desired image of a bicycle can be provided.

Further, the system described in the above example embodiment can be applied to a use for common image display that is not limited to bicycles as with a third example embodiment described below.

[Third Example Embodiment]

Figure 9:
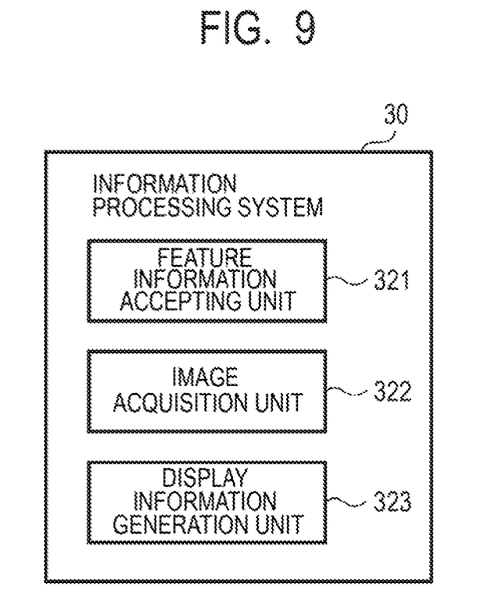
FIG. 9 is a function block diagram of an information processing system according to a third example embodiment.

FIG. 9 is a function block diagram of an information processing system 30 according to the third example embodiment. The information processing system 30 has a feature information accepting unit 321, an image acquisition unit 322, and a display information generation unit 323. The feature information accepting unit 321 accepts entry of feature information associated with a position of a feature map by causing the user to specify the position in the feature map in which a plurality of feature images indicating features to be displayed are arranged. The image acquisition unit 322 acquires an image used for display based on the feature information. The display information generation unit 323 generates display information used for causing a display device to display the image used for display.

According to the present example embodiment, the information processing system 30 that enables easier display of a desired image can be provided.

For example, the information processing system 30 of the present example embodiment may display an auto-bicycle (motorcycle). In such a case, feature information on an auto-bicycle specified in a feature map may be the shape of a handle, a fuel tank, a muffler, or the like.

[Modified Example Embodiments]

The present invention is not limited to the example embodiments described above and can be appropriately changed within the scope not departing from the spirit of the present invention.

In the operation window 150 of FIG. 5, while the check boxes 153 and 159 can be operated by pressing the buttons 152 and 158, respectively, for preventing a wrong operation, the check boxes 153 and 159 may be always in an operable state. In such a case, the buttons 152 and 158 can be omitted, and the operation window 150 can be simplified. Similarly, the feature map display part 163 may be always in an operable state, the button 161 can be omitted, and the operation window 150 can be simplified.

While the feature map illustrated in FIG. 5 and FIG. 6 is on a two-dimensional plane with good balance between visibility and exhaustiveness of features, the number of dimensions of the feature map is not limited thereto. The feature map may be a one-dimensional map in which feature images are aligned vertically or horizontally and may be a three-dimensional map that represents a depth of images. In the case of a one-dimensional map, the feature map can have good visibility, which enables intuitively easier recognition. In the case of a three-dimensional map, the feature map can have good exhaustiveness because it can represent a plurality of features. In addition, a plurality of two-dimensional plane feature maps may be stacked in the depth direction to form a 2.5-dimensional map.

The information processing systems 10, 20, and 30 may have a function of acquiring the original image illustrated in FIG. 3 from an imaging device such as a surveillance camera via the network. In such a case, the acquired original image may be displayed on the display device 106 by image display software. The user can operate the operation window 150 while viewing the original image displayed on the display device 106.

In the first example embodiment, while the image acquisition unit 122 selects an image used for display that is close to the specified conditions out of a number of images stored in a database, another scheme than the above may be employed as long as an image used for display can be acquired. For example, the image acquisition unit 122 may acquire an image used for display by generating an image used for display by using photomontage. The photomontage is a scheme to combine a plurality of images to obtain one image. Specifically, images of portions of bicycles may be stored in a database in advance, and the image acquisition unit 122 can generate an image used for display by combining images of portions of bicycles similar to the specified conditions and thereby acquire an image used for display. For example, images of portions of bicycles may be stored in advance on a frame basis, on a pedal basis, on a tire basis, on a saddle basis, on a handle basis, on a basket basis, on a power generator basis, on a light basis, on a chain cover basis, or the like in a database, and these images may be combined to generate an image of one bicycle. With respect to a model for which it is difficult to acquire the image of the bicycle, such as a model not listed on any catalog, there may be no bicycle similar to the specified conditions in a database. In this scheme, an image of a bicycle similar to the specified conditions can be generated by combining images of portions of bicycles by using photomontage, and even an image which is not stored in the database can be displayed. Both images of bicycles and images of portions of bicycles may be included in a database in advance, and image generation may be performed with photomontage only when there is no image of a similar bicycle. When an object to be displayed is an auto-bicycle, images stored in a database may be images of portions of auto-bicycles such as a handle, a fuel tank, a muffler, or the like.

While operations to generate an image of a feature map and create a feature map such as an operation to associate a position in a feature map with feature information may be manually performed by a creator of the information processing system 10, automatic generation may be performed by utilizing a machine learning technique. Further, a part of a process of feature map generation may be automatically performed, and the rest may be manually performed. An example of an automatic generation scheme of a feature map using an auto-encoder will be described. The auto-encoder performs a supervised machine learning using the same data for an input layer and an output layer in a neural network. As described above, a number of images of bicycles are stored in a database. By using these images of bicycles as input data of a neural network and performing learning so that output data of the same image is obtained, it is possible to automatically extract a feature of a bicycle. By associating the features of bicycles obtained accordingly with coordinates and automatically arranging images, it is possible to generate a feature map. This reduces the man-hours required for creation of a feature map and update of the feature map accompanied by update of a database. Note that images used as input data and output data may be images of portions of bicycles such as a frame, a pedal, a tire, a saddle, a handle, a basket, a power generator, a light, a chain cover, or the like of a bicycle. By using images limited to a portion in advance that may be a feature, learning can be performed at higher accuracy compared to a case where the whole image of a bicycle is an object to be displayed. When an object to be displayed is an auto-bicycle, an image used as input data and output data may be images of portions of auto-bicycles such as a handle, a fuel tank, a muffler, or the like.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An information processing system comprising:

a feature information accepting unit that, by causing a user to specify a position in a feature map in which a plurality of feature images indicating features of bicycles to be displayed are arranged, accepts entry of feature information associated with the position in the feature map;

an image acquisition unit that acquires an image used for display of a bicycle based on the feature information; and a display information generation unit that generates display information used for causing a display device to display the image used for display.

(Supplementary Note 2)

The information processing system according to supplementary note 1, wherein each of the feature images includes an image indicating a feature of a shape of a part of the bicycle.

(Supplementary Note 3)

The information processing system according to supplementary note 1 or 2, wherein the feature image includes an image indicating a shape of a frame of the bicycle.

(Supplementary Note 4)

The information processing system according to any one of supplementary notes 1 to 3, wherein the image acquisition unit acquires the image used for display by selecting the image used for display out of a plurality of images of bicycles stored in a database.

(Supplementary Note 5)

The information processing system according to any one of supplementary notes 1 to 3, wherein the image acquisition unit acquires the image used for display by combining a plurality of images of portions of bicycles stored in a database and generating the image used for display.

(Supplementary Note 6)

The information processing system according to any one of supplementary notes 1 to 5, wherein the feature map is a map in which the plurality of feature images are arranged at positions in accordance with features of the bicycles.

(Supplementary Note 7)

The information processing system according to any one of supplementary notes 1 to 6, wherein the feature map is a map in which the plurality of feature images are arranged at positions in accordance with features of the bicycles on a two-dimensional plane.

(Supplementary Note 8)

The information processing system according to any one of supplementary notes 1 to 7, wherein the feature map is generated based on a feature of a bicycle acquired by machine learning.

(Supplementary Note 9)

The information processing system according to any one of supplementary notes 1 to 8, wherein the feature map is generated based on a feature of a bicycle acquired by an auto-encoder in which an image including a bicycle is used as input data and output data.

(Supplementary Note 10)

The information processing system according to any one of supplementary notes 1 to 9, wherein the feature map is generated based on a feature of a bicycle acquired by an auto-encoder in which an image of a portion of a bicycle is used as input data and output data.

(Supplementary Note 11)

The information processing system according to any one of supplementary notes 1 to 10 further comprising a first weight accepting unit that accepts entry of weighting provided to the feature information when the image used for display is acquired in the image acquisition unit.

(Supplementary Note 12)

The information processing system according to any one of supplementary notes 1 to 11 further comprising a color information accepting unit that accepts entry of color information related to a color of the bicycle, wherein the image acquisition unit further acquires the image used for display based on the color information.

(Supplementary Note 13)

The information processing system according to supplementary note 12 further comprising a second weight accepting unit that accepts entry of weighting provided to the color information when the image used for display is acquired in the image acquisition unit.

(Supplementary Note 14)

The information processing system according to supplementary note 12 or 13, wherein the color information includes information as to whether or not the color is a metallic color.

(Supplementary Note 15)

The information processing system according to any one of supplementary notes 1 to 14 further comprising a power generator information accepting unit that accepts entry of power generator information indicating whether or not the bicycle has a power generator, wherein the image acquisition unit further acquires the image used for display based on the power generator information.

(Supplementary Note 16)

The information processing system according to any one of supplementary notes 1 to 15, wherein the image acquisition unit acquires a plurality of images used for display, and wherein the display information generation unit generates the display information so that the plurality of images used for display are arranged in order based on the feature information and displayed on the display device.

(Supplementary Note 17)

An information processing method comprising:

by causing a user to specify a position in a feature map in which a plurality of feature images indicating features of bicycles to be displayed are arranged, accepting entry of feature information associated with the position in the feature map;

acquiring an image used for display of a bicycle based on the feature information; and generating display information used for causing a display device to display the image used for display.

(Supplementary Note 18)

A storage medium storing a program that causes a computer to perform:

by causing a user to specify a position in a feature map in which a plurality of feature images indicating features of bicycles to be displayed are arranged, accepting entry of feature information associated with the position in the feature map;

acquiring an image used for display of a bicycle based on the feature information; and generating display information used for causing a display device to display the image used for display.

(Supplementary Note 19)

An information processing system comprising:

a feature information accepting unit that, by causing a user to specify a position in a feature map in which a plurality of feature images indicating features of objects to be displayed are arranged, accepts entry of feature information associated with the position in the feature map;

an image acquisition unit that acquires an image used for display based on the feature information; and a display information generation unit that generates display information used for causing a display device to display the image used for display.

REFERENCE SIGNS LIST 10, 20, 30 information processing system
106 display device
121, 221, 321 feature information accepting unit
122, 222, 322 image acquisition unit
123, 223, 323 display information generation unit
124 first weight accepting unit
125 color information accepting unit
126 second weight accepting unit
127 power generator information accepting unit
128 termination process accepting unit
150 operation window
163 feature map display part
170 search result window
171 bicycle image display part

The invention claimed is:

1. An information processing system comprising:
a processor; and
a memory storing executable instructions that, when executed by the processor, causes the processor to perform as:
a feature information accepting unit that, by causing a user to specify a position in a feature map in which a plurality of feature images indicating features of bicycles to be displayed are arranged, accepts entry of feature information associated with the position in the feature map;
an image acquisition unit that acquires an image used for display of a bicycle based on the feature information; and
a display information generation unit that generates display information used for causing a display device to display the image used for display,
wherein the feature map is a map in which the plurality of feature images are arranged at positions in accordance with features of the bicycles,
wherein a first feature image indicating a first portion of a first bicycle, a second feature image indicating a second portion of a second bicycle, and a third feature image indicating a third portion of a third bicycle are arranged in the feature map,
wherein the first portion, the second portion, and the third portion are a same kind of parts included in bicycles, and
wherein when a similarity in shapes of the first portion and the second portion is higher than a similarity in shapes of the first portion and the third portion, a distance between the first feature image and the second feature image in the feature map is less than a distance between the first feature image and the third feature image in the feature map.

2. The information processing system according to claim 1, wherein each of the feature images includes an image indicating a feature of a shape of a part of the bicycle.

3. The information processing system according to claim 1, wherein the feature image includes an image indicating a shape of a frame of the bicycle.

4. The information processing system according to claim 1, wherein the image acquisition unit acquires the image used for display by selecting the image used for display out of a plurality of images of bicycles stored in a database.

5. The information processing system according to claim 1, wherein the image acquisition unit acquires the image used for display by combining a plurality of images of portions of bicycles stored in a database and generating the image used for display.

6. The information processing system according to claim 1, wherein the feature map is a map in which the plurality of feature images are arranged at positions in accordance with features of the bicycles on a two-dimensional plane.

7. The information processing system according to claim 1, wherein the feature map is generated based on a feature of a bicycle acquired by machine learning.

8. The information processing system according to claim 1, wherein the feature map is generated based on a feature of a bicycle acquired by an auto-encoder in which an image including a bicycle is used as input data and output data.

9. The information processing system according to claim 1, wherein the feature map is generated based on a feature of a bicycle acquired by an auto-encoder in which an image of a portion of a bicycle is used as input data and output data.

10. The information processing system according to claim 1 wherein the instructions further cause the processor to perform as a first weight accepting unit that accepts entry of weighting provided to the feature information when the image used for display is acquired in the image acquisition unit.

11. The information processing system according to claim 1 wherein the instructions further cause the processor to perform as a color information accepting unit that accepts entry of color information related to a color of the bicycle, wherein the image acquisition unit further acquires the image used for display based on the color information.

12. The information processing system according to claim 11 wherein the instructions further cause the processor to perform as a second weight accepting unit that accepts entry of weighting provided to the color information when the image used for display is acquired in the image acquisition unit.

13. The information processing system according to claim 11, wherein the color information includes information as to whether or not the color is a metallic color.

14. The information processing system according to claim 1 wherein the instructions further cause the processor to perform as a power generator information accepting unit that accepts entry of power generator information indicating whether or not the bicycle has a power generator, wherein the image acquisition unit further acquires the image used for display based on the power generator information.

15. The information processing system according to claim 1, wherein the image acquisition unit acquires a plurality of images used for display, and wherein the display information generation unit generates the display information so that the plurality of images used for display are arranged in order based on the feature information and displayed on the display device.

16. An information processing method comprising:
by causing a user to specify a position in a feature map in which a plurality of feature images indicating features of bicycles to be displayed are arranged, accepting entry of feature information associated with the position in the feature map;
acquiring an image used for display of a bicycle based on the feature information; and
generating display information used for causing a display device to display the image used for display,
wherein the feature map is a map in which the plurality of feature images are arranged at positions in accordance with features of the bicycles,
wherein a first feature image indicating a first portion of a first bicycle, a second feature image indicating a second portion of a second bicycle, and a third feature image indicating a third portion of a third bicycle are arranged in the feature map,
wherein the first portion, the second portion, and the third portion are a same kind of parts included in bicycles, and
wherein when a similarity in shapes of the first portion and the second portion is higher than a similarity in shapes of the first portion and the third portion, a distance between the first feature image and the second feature image in the feature map is less than a distance between the first feature image and the third feature image in the feature map.

17. A non-transitory storage medium storing a program that causes a computer to perform:
by causing a user to specify a position in a feature map in which a plurality of feature images indicating features of bicycles to be displayed are arranged, accepting entry of feature information associated with the position in the feature map;
acquiring an image used for display of a bicycle based on the feature information; and
generating display information used for causing a display device to display the image used for display,
wherein the feature map is a map in which the plurality of feature images are arranged at positions in accordance with features of the bicycles,
wherein a first feature image indicating a first portion of a first bicycle, a second feature image indicating a second portion of a second bicycle, and a third feature image indicating a third portion of a third bicycle are arranged in the feature map,
wherein the first portion, the second portion, and the third portion are a same kind of parts included in bicycles, and
wherein when a similarity in shapes of the first portion and the second portion is higher than a similarity in shapes of the first portion and the third portion, a distance between the first feature image and the second feature image in the feature map is less than a distance between the first feature image and the third feature image in the feature map.

\* \* \* \* \*